(12) United States Patent
Flock et al.

(10) Patent No.: US 6,507,177 B2
(45) Date of Patent: Jan. 14, 2003

(54) CONTROL CIRCUIT FOR THE POWER CONTROLLED OPERATION OF A LOAD

(75) Inventors: Horst Flock, Reutlingen (DE); Ignaz Fortmeier, Ludwigshafen (DE)

(73) Assignee: Alcoa Fujikura Gesellschaft mit beschraenkter Haftung, Frankfurt am Main (DE)

(*) Notice: Subject to any disclaimer, the term of this patent is extended or adjusted under 35 U.S.C. 154(b) by 0 days.

(21) Appl. No.: 09/874,943

(22) Filed: Jun. 5, 2001

(65) Prior Publication Data

US 2002/0181255 A1 Dec. 5, 2002

(51) Int. Cl.⁷ .................................................. G05F 1/40
(52) U.S. Cl. ...................................................... 323/285
(58) Field of Search .................................. 323/282, 283, 323/284, 285

(56) References Cited

U.S. PATENT DOCUMENTS

| | | |
|---|---|---|
| 3,971,972 A | 7/1976 | Stich |
| 5,565,762 A * | 10/1996 | Ishikawa et al. ............ 323/222 |
| 5,977,743 A | 11/1999 | Flock |
| 6,154,374 A * | 11/2000 | Uejima et al. ................ 363/16 |

FOREIGN PATENT DOCUMENTS

| | | |
|---|---|---|
| DE | 26 10 432 | 9/1976 |
| DE | 42 18 541 | 12/1993 |
| DE | 196 06 525 | 8/1997 |
| DE | 197 02 949 | 7/1998 |
| EP | 0 088 277 | 9/1983 |
| GB | 2 267 581 | 12/1993 |

* cited by examiner

*Primary Examiner*—Shawn Riley
(74) *Attorney, Agent, or Firm*—Barry R. Lipsitz

(57) ABSTRACT

A control circuit is provided for the power-controlled operation of a load in a portion of a load range. A semiconductor switch is provided which is effective in a load circuit. A drive circuit for the switch generates a control signal. The control signal comprises drive pulses following one another and separated by interpulse periods, for controlling the load in a portion of the load range. In an upper portion of the portion of the load range, the control signal comprises a first pulse signal, with first individual pulses following one another with a first pulse frequency, and a second pulse signal, with second individual pulses following one another with a second pulse frequency in the interpulse periods of the first pulse signal. The second pulse frequency may be greater than the first pulse frequency by at least a factor of 10.

31 Claims, 7 Drawing Sheets

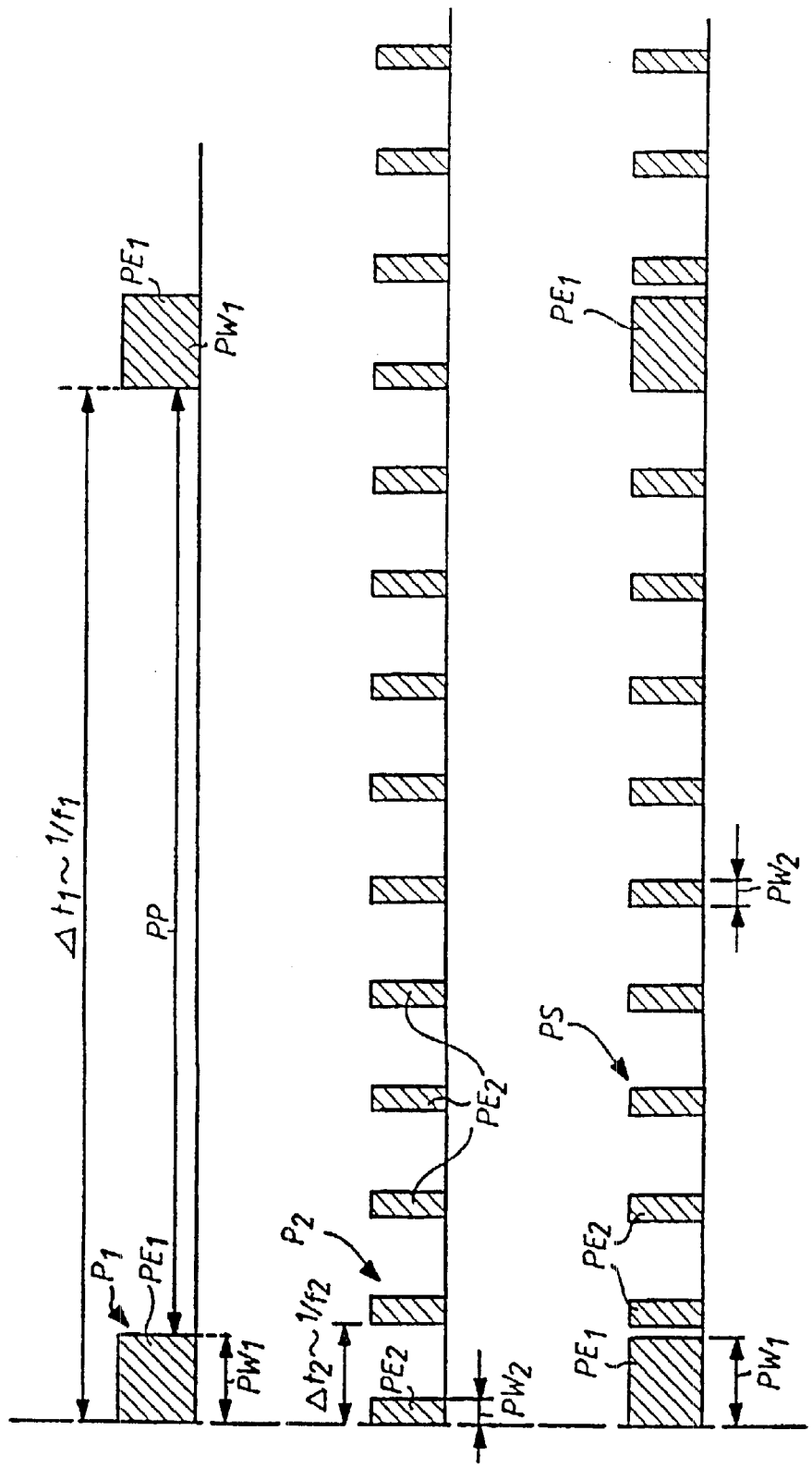

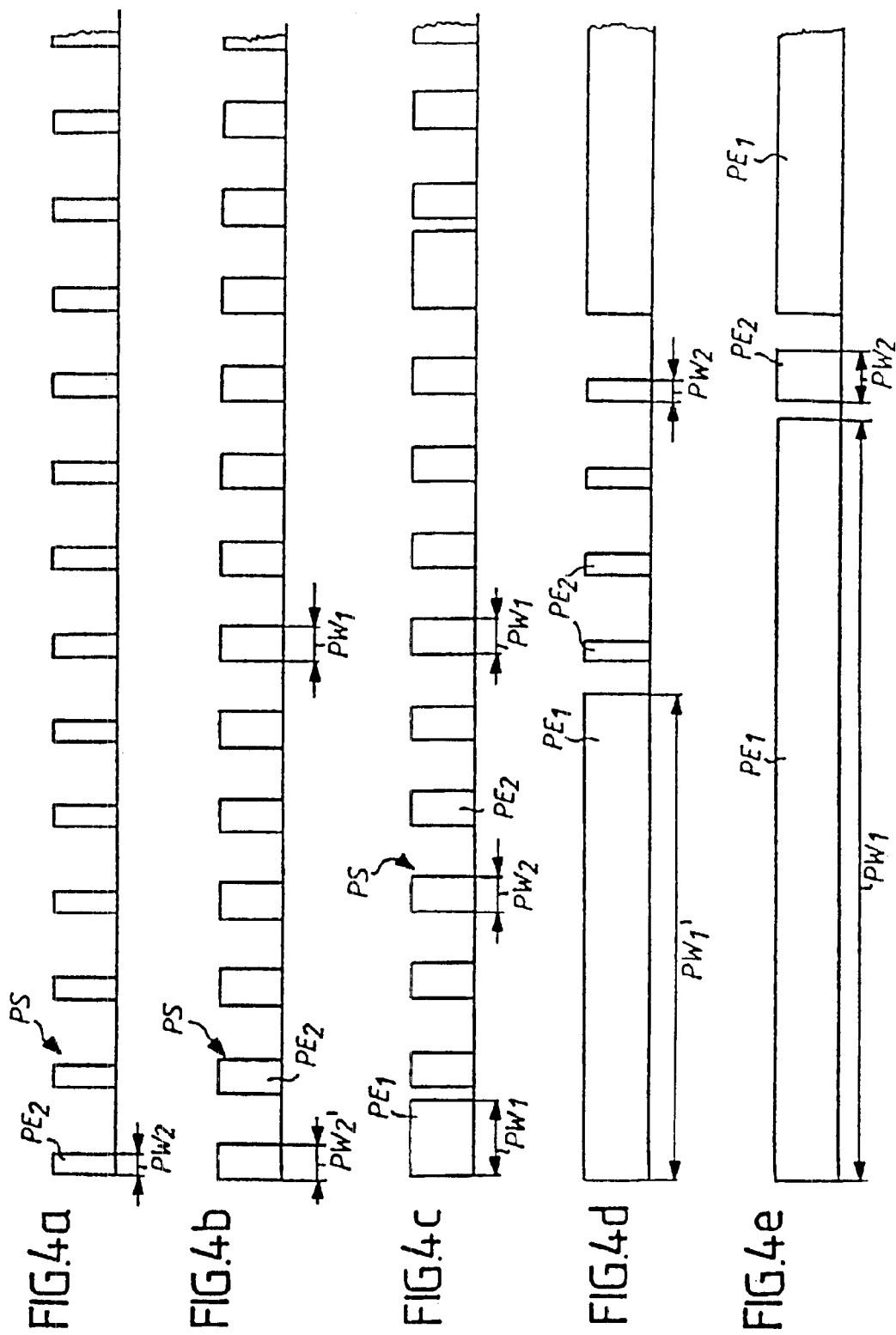

CONTROL CIRCUIT FOR THE POWER CONTROLLED OPERATION OF A LOAD

BACKGROUND OF THE INVENTION

The invention relates to a control circuit for the power-controlled operation of a load, comprising a semiconductor switch which is effective in a load circuit and comprising a drive circuit for the semiconductor switch, which generates a control signal, comprising drive pulses following one after the other and separated by interpulse periods, for controlling the said semiconductor switch in a part-load range.

A control circuit of this type is known from the prior art, for example DE 197 02 949 A1.

A control circuit of this type generates a control signal which has drive pulses which follow one another in a defined frequency and are pulse-width-modulated for controlling the load.

Since the switching on and off of the load brought about by the drive pulses leads in a known way to high losses, and in particular increased heat generation, especially in the case of an inductive load with a freewheeling element, i.e., for example, a freewheeling semiconductor component, it is to be regarded as the object of the present invention to improve a control circuit of the generic type in such a way that as little heat as possible is generated.

SUMMARY OF THE INVENTION

This object is achieved according to the invention in the case of a control circuit of the type described at the beginning by the control signal generating in an upper part-load range a first pulse signal, with first individual pulses following one another with a first pulse frequency, and a second pulse signal, with second individual pulses following one another with a second frequency, in the interpulse periods of the first pulse signal, and by the second frequency being greater than the first frequency by at least a factor of 10.

It is consequently to be regarded as the essence of the present invention on the one hand to drive the load, i.e. for example a motor acting as an inductive load, by the first pulse signal with low frequency in such a way that this pulse signal allows as much power as possible to be supplied to the load with as few switching-on and switching-off operations as possible, but on the other hand likewise to supply power by the second pulse signal with high frequency in the long periods between the individual pulses caused by the low frequency of the first pulse signal, in order to avoid the disadvantages of exclusively operating the load by only the first pulse signal with low frequency, these disadvantages being manifested in particular by the development of mechanical noises or the production of mechanical resonances.

With regard to controlling the power which is to be supplied to the load, a wide variety of possibilities exist here. One possibility would be to alter the frequency of the second pulse signal or, if appropriate, also of the first pulse signal.

Since, however, defined fixed frequencies are preferably used for the pulsed operation of a load to avoid peripheral disturbing influences, it is preferably provided that in the upper part-load range at least one of the first and second pulse signals can be pulse-width-modulated for power control, i.e. that the power supplied to the load can be controlled by means of varying the pulse width while the respective pulse signal has a fixed frequency.

It is particularly favourable in the case of the solution according to the invention if in the upper part-load range both pulse signals can be pulse-width-modulated, so that incremental adjustment of the pulse width of the two pulse signals allows the desired precision of the control to be achieved by setting the pulse width of that pulse signal which has the smaller increments. This is preferably the second pulse signal, it also being possible to use the second pulse signal to reduce an increase in the pulse width of the first pulse signal by a decreasing pulse width of the second pulse signal.

In the case of a control circuit operating in a particularly simple way, it is preferably provided that in the upper part-load range only one of the pulse signals can be pulse-width-modulated.

In this case, particularly precise power control can be carried out by allowing the upper part-load range to be divided into a highest upper part-load range and a normal upper part-load range and by allowing the individual pulses of the first pulse signal to be pulse-width-modulated in the normal upper part-load range and the individual pulses of the second pulse signal to be pulse-width-modulated in the highest upper part-load range.

In particular in the case of an embodiment operating in as simple a way as possible, it is at the same time provided that in the normal upper part-load range, the pulse width of the individual pulses of the second pulse signal is constant, and in the highest upper part-load range, the pulse width of the individual pulses of the first pulse signal is preferably constant.

It would be conceivable, for example, within the scope of the solution according to the invention, also to operate outside the upper part-load range with a control signal which exhibits the first pulse signal and, in the interpulse periods of the same, the second pulse signal.

However, for reasons of control simplicity and adequate precision, it is particularly favourable if, in a part-load range lying below the upper part-load range, the control signal comprises a third pulse signal with a third frequency, which is greater than the first frequency, so that the individual pulses of the third pulse signal follow one another at correspondingly small time intervals.

At the same time, the third frequency should preferably be of the same order of magnitude as the second frequency, so that both the second frequency and the third frequency are significantly above the first frequency, to allow driving of the load to be performed in the lower part-load range with as little noise and resonance as possible.

A solution which is particularly favourable on account of its simplicity provides that the third frequency and the second frequency are approximately of the same magnitude, so that the advantageous control properties of a pulse signal with a relatively high pulse frequency can consequently be utilized both in the lower part-load range and in the upper part-load range.

A particularly favourable solution provides that the third frequency is identical to the second frequency, so that ultimately the same frequency can always be used both for operating the load in the lower part-load range and for operating the load in the upper part-load range, and the second pulse signal is simply added when there is a transition from the lower part-load range to the upper part-load range.

For the power control in the lower part-load range, in this case the third pulse signal can preferably likewise be pulse-width-modulated.

The transition from the lower part-load range into the upper part-load range may in principle lie at any desired values of the part load. A particularly advantageous solution provides that the transition from the lower part-load range into the upper part-load range takes place at part-load values between approximately 20% and approximately 50%, in each case with respect to full load.

A particularly favourable solution provides that the transition from the lower part-load range into the upper part-load range takes place at part-load values of approximately 30% to approximately 40%. With regard to the differences of the second frequency and the third frequency with respect to the first frequency, it is adequate in principle—as already stated—that they are at least a factor of 10. It is particularly favourable, however, if the frequency differences have a factor of the order of magnitude of 30 or more, preferably the order of magnitude of 100 or more.

In principle it would be possible to operate in the part-load range below full driving of the load with further part-load ranges, for example also between the lower part-load range and the upper part-load range. For reasons of simplicity, however, it has been found to be favourable if the upper part-load range follows on directly from the lower part-load range.

It would additionally also be conceivable to provide outside the lower and upper part-load ranges additional part-load ranges, in which a different kind of driving of the part load can take place.

It is particularly favourable, however, if the lower part-load range and the upper part-load range cover the entire part-load range up to full load.

With regard to generating the control signals in the case of a control circuit according to the invention, no further details have been specified, in particular concerning the construction of the drive circuit. Thus, an advantageous solution provides that the drive circuit has a pulse generator and a pulse-shaping stage, it being possible for the pulse generator to be in particular a pulse generator substantially generating square-wave pulses, and the pulse-shaping stage then shaping the edges of the square-wave pulses for example in such a way that sufficiently long control times are available for the operation of the load, in particular an inductive load with a freewheeling diode.

It is particularly favourable in this case if the pulse-shaping stage generates from the square-wave pulses, rise and fall times which are time-delayed substantially in the edges.

Time-delayed rise and fall times of this type can be generated, for example, by RC elements of the pulse-shaping stage.

With regard to the generation of the first pulse signal and the second pulse signal, occurring in the interpulse periods of the first pulse signal, no further details have been specified so far. Thus, an advantageous embodiment provides that the first pulse signal and the second pulse signal can be generated as pulse signal trains having continuous individual pulses with constant frequency and that the control signal for the upper part-load range is produced from the pulse signal trains by conducting an OR operation.

This type of control signal generation can also be retained when the control signal for the lower part-load range is to be generated. In this case, for the sake of simplicity, the pulse width of the first pulse signal is reduced to substantially 0.

In addition, the object mentioned at the beginning is also achieved according to the invention by a method for the power-controlled operation of a load by means of a control circuit, comprising a semiconductor switch which is effective in a load circuit and comprising a drive circuit for the semiconductor switch, which generates a control signal, comprising drive pulses following one after the other and separated by interpulse periods, for controlling the said semiconductor switch in a part-load range, by the control signal being generated in an upper part-load range in such a way that it has a first pulse signal, with individual pulses following one another with a first pulse frequency, and a second pulse signal, with individual pulses following one another with a second frequency, in the interpulse periods of the first pulse signal, and by the second frequency being greater than the first frequency by at least a factor of 10.

It is particularly favourable in this case if, in the upper part-load range, the power control is carried out by pulse width modulation of at least one of the first and second pulse signals, the frequency of the first pulse signal and of the second pulse signal preferably being kept constant.

A particularly favourable solution with regard to the possibility of variation in this case provides that the pulse width of both pulse signals is modulated for the power control.

For reasons of simplicity, however, it is favourable if only the pulse width of one of the pulse signals is modulated, whereas the other of the pulse signals is kept constant.

Furthermore, it is of advantage for particularly precise control if the upper part-load range is divided into a highest upper part-load range and a normal upper part-load range.

Preferably, the first pulse signal is modulated with regard to the pulse width for the power control in the normal upper part-load range, while the second pulse signal is modulated for controlling the power in the highest upper part-load range.

For the sake of simplicity, the other pulse signal, respectively, in this case remains constant with regard to its pulse width.

In addition, it is of advantage for controlling the power outside the upper part-load range if, below the upper part-load range, a control signal which comprises a third pulse signal with a third frequency, which is greater than the first frequency, is generated.

In this case, the third frequency is preferably likewise chosen such that it is of the same order of magnitude as the second frequency.

For reasons of simplicity, however, it is particularly favourable if the third frequency is identical to the second frequency.

Furthermore, it is likewise of advantage for controlling the power in the lower part-load range if the third pulse signal is modulated with regard to its pulse width, the frequency with which the individual pulses follow one another in the case of the third pulse signal likewise being kept constant in particular.

With regard to the position of the upper part-load range and of the lower part-load range in relation to one another, so far likewise no specific details have been specified. The upper part-load range and the lower part-load range could, for example, still be separate from one another. It is particularly favourable, however, if the upper part-load range follows on directly from the lower part-load range.

Furthermore, it is preferably provided for reasons of simplicity that the lower part-load range and the upper part-load range cover the entire part-load range up to full load.

To allow the control signal to be generated as simply as possible in the case of the method according to the invention, it is preferably provided that the first pulse signal and second pulse signal are generated as continuous pulse signal trains with constant frequency and the control signal in the upper part-load range is generated from the two pulse signal trains by conducting an OR operation.

In the same way, there is also the possibility of generating the control signal in the lower part-load range, the pulse width in this case being kept substantially at 0.

Further features and advantages of the invention are the subject of the following description and the graphic representation of an exemplary embodiment, in which:

BRIEF DESCRIPTION OF THE DRAWINGS

FIG. 3 shows a schematic representation of the generation of a pulse control signal within the scope of the solution according to the invention from a first pulse signal train and a second pulse signal train by conducting an OR operation;

FIGS. 4a–4e shows an exemplary representation of the control signal in the case of various part-load values within the scope of the solution according to the invention;

DETAILED DESCRIPTION OF THE INVENTION

Figure 1:
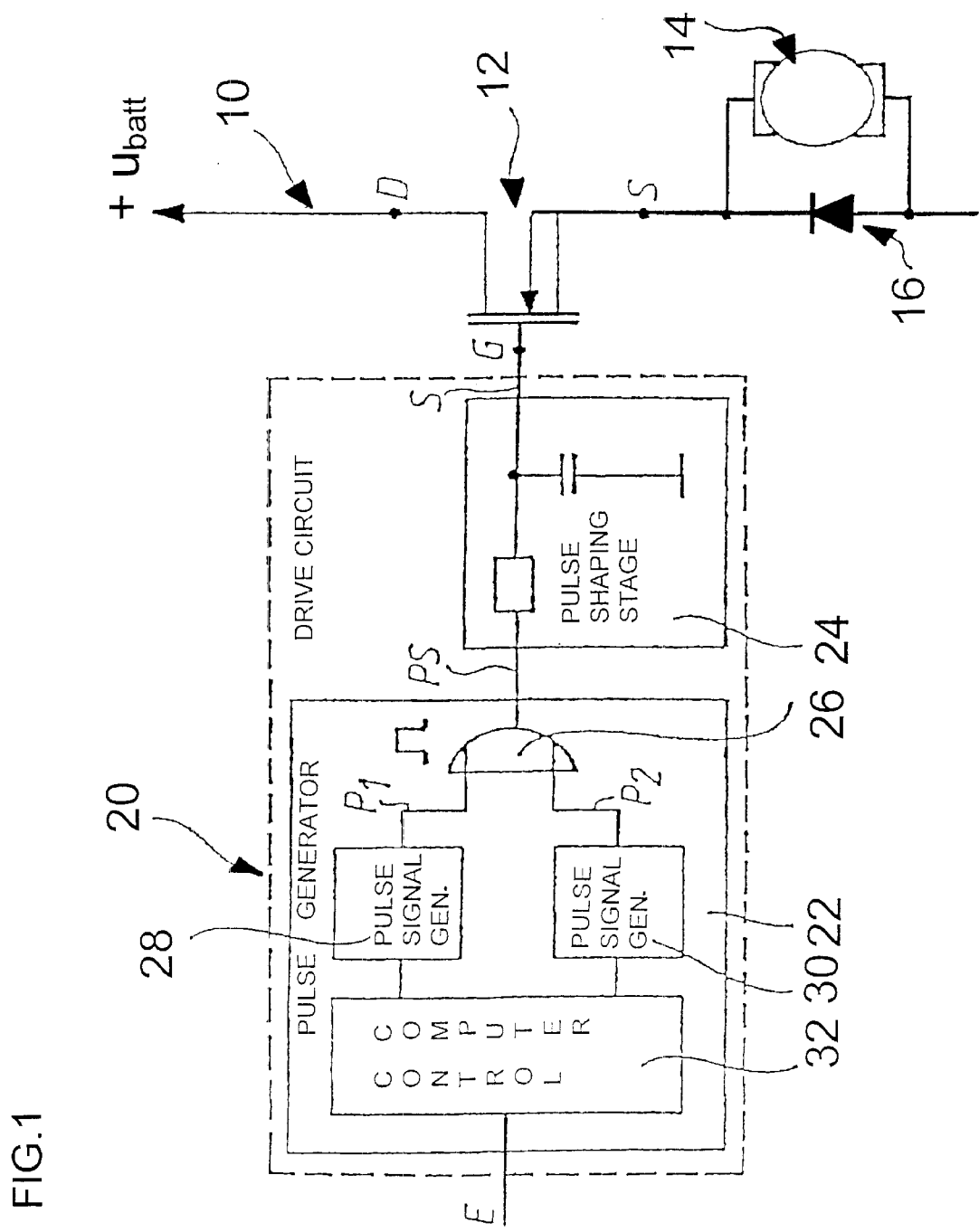
FIG. 1 shows a schematic representation of a first exemplary embodiment of a control circuit according to the invention.

An exemplary embodiment of a control circuit according to the invention, represented in FIG. 1, comprises a load circuit 10, which extends between a positive feed voltage $U_{batt}$ and earth and in which there is a semiconductor circuit, which is designated overall by 12 and is formed for example as a MOSFET, a drain terminal D being connected to the positive feed voltage $U_{batt}$, a gate terminal G being provided for driving purposes and a source terminal being connected to a load 14, for example an inductive load in the form of a motor in particular. Connected paralel with this inductive load 14 there is, furthermore, a freewheeling diode 16, so that the load 14 and the parallel-connected freewheeling diode 16 are on the one hand connected to the source terminal S of the semiconductor circuit 12 and on the other hand are connected to earth.

For driving the semiconductor switch 12, in the case of the MOSFET semiconductor switch the gate terminal G is connected to a drive circuit 20, which generates a control signal S which is supplied to the gate terminal G and comprises drive pulses following one after the other and separated by interpulse periods. This control signal S is generated by a pulse generator 22 and a following pulse-shaping stage 24, the pulse generator 22 generating square-wave pulses, the edge steepness of which is fixed by the pulse-shaping stage 24, for example in such a way that the rise and fall edges are delayed sufficiently long to give the freewheeling diode 16 enough time for switching on or switching off.

The pulse generator 22 preferably comprises an OR gate 26, two pulse signal generators 28 and 30 and a control computer 32, which drives the pulse signal generators 28 and 30, so that the latter for their part generate pulse signal trains $P_1$ and $P_2$, respectively, which are added in the adder 26 to form a pulse control signal PS.

The control computer 32 receives via an input signal E the information concerning the power with which the load 14 is to be operated.

Figure 2:
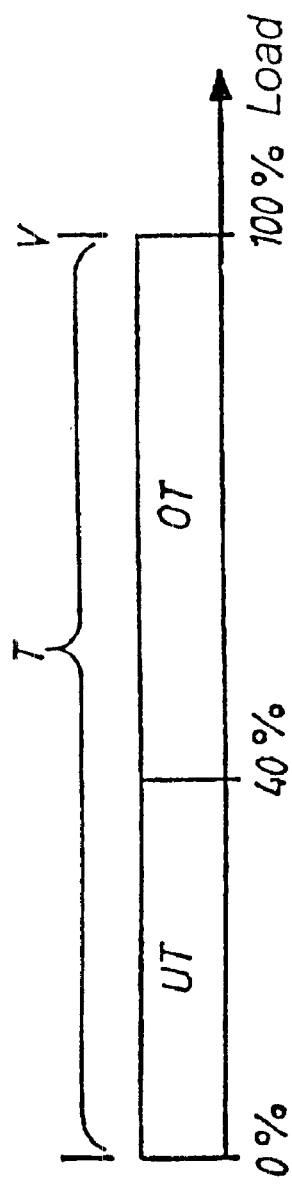
FIG. 2 shows a schematic representation of the division of the part-load range into a lower part-load range and an upper part-load range.

As represented in FIG. 2, there is an internal differentiation in the control computer, on the basis of the input signal E, between a lower part-load range UT and an upper part-load range OT, the lower part-load range UT preferably beginning at a power feeding of 0% with respect to full load and reaching in the part-load range T up to a part load of, for example, 40% with respect to full load. This is then directly followed by the upper part-load range OT, which reaches up to full power V, i.e. power of 100%, so that the entire part-load range T is fully covered by the lower part-load range and the upper part-load range.

It is also conceivable, however, to choose the part-load range in such a way that it neither begins at 0% nor ends at 100%, but lies between these values.

If the input signal E provides that the load 14 is to be operated in the upper part-load range OT, the control computer 32 drives the first pulse signal generator 28 in such a way that it generates a pulse signal train $P_1$ with a first frequency $f_1$, the individual pulses $PE_1$ of which respectively start after time intervals $\Delta t_1$ which correspond to the frequency $f_1$.

These individual pulses $PE_1$ have in this case a pulse width $PW_1$ which can be set by the control computer 32, whereas, for the sake of simplicity, the frequency $f_1$, cannot be adjusted but instead can be prescribed as a fixed value for the first pulse signal generator 28.

The setting of the pulse width $PW_1$ takes place, as explained in detail below, in accordance with the power desired at the load.

Furthermore, the control computer 32 drives the second pulse signal generator 30, which generates a second pulse signal train $P_2$, likewise represented in FIG. 3, the second pulse signal train $P_2$ generating individual pulses which follow one another with a second frequency $f_2$ and are consequently generated one after the other in a time interval $\Delta t_2$ corresponding to this second frequency $f_2$.

In this case, the frequency $f_2$ is at least ten times the frequency $f_1$; frequencies of the order of magnitude of 10 kHz or several 10 kHz are preferably chosen for the frequency $f_2$, whereas the frequencies $f_1$ are of the order of magnitude of some 100 Hz, so that, in terms of its order of magnitude, the frequency $f_2$ is preferably one hundred times the frequency $f_1$.

The pulse width $PW_2$ of the individual pulses $PE_2$ of the second pulse signal generator 30 can also be set by the control computer 32, whereas the frequency of the second pulse signal generator is usually likewise prescribed as a fixed value.

As represented in FIG. 3, the two pulse signal trains $P_1$ and $P_2$ are then combined by a logical operation by the adder 26 or the OR gate in such a way that a pulse control signal PS which represents the logical OR operation combining the two pulse signal trains $P_1$ and $P_2$ is obtained as a result, so that the pulse control signal PS exhibits the individual pulses $PE_1$, of the first pulse signal train $P_1$, since the existence of the individual pulses $PE_2$ of the second pulse signal train $P_2$ is insignificant during the time in which the individual pulses $PE_1$ are present, in particular whenever the individual pulses $PE_1$, have a greater pulse width $PW_1$, than the individual pulses $PE_2$ of the second pulse signal train.

During the interpulse periods PP between the individual pulses $PE_1$, of the first pulse signal train $P_1$, however, the individual pulses $PE_2$ of the second pulse signal train $P_2$ then occur in the pulse control signal PS.

Since the pulse widths $PW_1$ of the individual pulses $PE_2$, of the first pulse signal train $P_1$, are generally greater than the pulse widths $PW_2$ of the individual pulses $PE_2$ of the second pulse signal train $P_2$, a longer switching-through of the semiconductor switch 12 takes place each time the individual pulses $PE_1$, occur in the pulse control signal PS in comparison with the switching-through of the semiconductor switch 12 when an individual pulse $PE_2$ from the second pulse signal train $P_2$ occurs during the interpulse periods PP between the individual pulses $PE_1$ of the first pulse signal train $P_1$.

In the upper part-load range OT, there is then the possibility of controlling the power supplied to the load 14 by varying either the pulse width $PW_1$ of the individual pulses $PE_1$ of the first pulse signal train $P_1$ or the pulse width $PW_2$ of the individual pulses $PE_2$ Of the second pulse signal train $P_2$ or the pulse widths $PW_1$ and $PW_2$ of both pulse signal trains $P_1$ and $P_2$, so that the power to be supplied to the load 14 can be adjusted as finely and precisely as desired.

However, the upper part-load range OT is preferably operated in such a way that the pulse width $PW_2$ of the individual pulses $PE_2$ of the second pulse signal train $P_2$ is kept as small as possible, by contrast with the greatest possible pulse width $PW_1$ of the individual pulses $PE_1$ of the first pulse signal train $P_1$, since the number of switching-on and switching-off operations can be reduced with an increasing pulse width $PW_1$, of the individual pulses $PE_1$ of the first pulse signal train if the pulse width $PW_1$ extends over at least one interval $\Delta t_2$ of the second pulse signal train $P_2$ and the overall number of switching-on and switching-off operations per unit of time decreases with an increasing pulse width $PW_1$ of the individual pulses $PE_1$ of the first pulse signal train $P_1$, since, on account of the switching-through of the semiconductor switch 12, the load 14 is continuously fed for a longer and longer period of time within the time interval $\Delta t_1$.

On the other hand, in the lower part-load range UT, preferably only the pulse control signal PS is generated on the basis of the second pulse signal train $P_2$ with variable pulse width $PW_2$.

Such a type of power control of the load 14 is indicated by way of example in FIG. 4 at several points of the part-load range T.

For example, in FIG. 4a, the pulse width $PW_2$ in the case of a part-load range of 25% with respect to full load has been chosen such that it corresponds to a quarter of the time interval $\Delta t_2$ which lies between the beginning of two successive individual pulses $PE_2$ of the second pulse signal train. If, as represented in FIG. 4b, it is intended to operate with a part load of 40%, the pulse width $PW_2'$ of the pulse control signal, which is still composed of individual pulses $PE_2$ of the second pulse signal train $P_2$, is increased.

If, as represented in FIG. 4c, a transition is then made from the lower part-load range into the upper part-load range, which begins for example at approximately 40%, the pulse control signal PS exhibits, as represented in FIG. 4c by way of example, on the one hand the individual pulses $PE_2$ with the pulse width $PW_2$ of the second pulse signal train $P_2$, but additionally the individual pulses $PE_1$ with the pulse width $PW_1$ of the first pulse signal train $P_1$, the individual pulses $PE_2$ of the second pulse signal train $P_2$ only occurring in the interpulse periods PP between successive individual pulses $PE_1$ of the first pulse signal train $P_1$.

Consequently, in the upper part-load range OT, both the pulse width $PW_2$ of the second pulse signal train $P_2$ and the pulse width $PW_1$ of the first pulse signal train $P_1$ can be controlled when increasing the power to be made available to the load 14. The pulse width $PW_1$ of the individual pulses $PE_1$ of the first pulse signal train is preferably increased with increasing power made available to the load 14, whereas a variation of the pulse width $PW_2$ of the individual pulses $PE_2$ of the second pulse signal train is only carried out for adjusting the power in stages graduated as finely as possible.

The pulse width $PW_1$ of individual pulses $PE_1$ of the first pulse signal train can be increased to such an extent that only one or just a few individual pulses $PE_2$ occur in the interpulse period PP between successive individual pulses $PE_1$.

To allow control to be carried out with as much precision as possible near to full power, it is preferably provided that, in the proximity of full load, the power control is substantially carried out by adjusting the pulse width $PW_2$ of the individual pulses $PE_2$ of the second pulse signal train.

Figure 5:
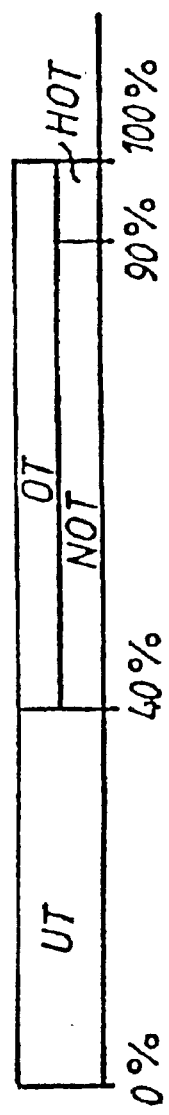
FIG. 5 shows a schematic representation of the division of the upper part-load range into a normal upper part-load range and a highest upper part-load range.

To allow the power to be controlled with as much precision as possible in particular in the proximity of the full-load range, the upper part-load range is preferably divided, as represented in FIG. 5, into a normal upper part-load range NOT, which reaches for example from 40% part load to 90% part load, and into a highest upper part-load range HOT, which reaches from 90% to 100%.

In this highest upper part-load range HOT, the pulse width $PW_1$ is no longer altered on the basis of the value of the pulse width $PW_1$ of the individual pulses $PE_1$ of the first pulse signal train at 90%, even when there is an increase in power, but instead this is followed by controlling the power by means of the variation of the pulse width $PW_2$ of the few individual pulses $PE_1$ of the second pulse signal train $P_2$ in the interpulse periods PP between successive individual pulses $PE_1$, to allow this control to be performed with as much precision as possible.

In principle, both a variation of the pulse width $PW_1$ and a variation of the pulse width $PW_2$ would be possible here for setting the power in the normal upper part-load range NOT.

This procedure is particularly simple in the normal upper part-load range NOT whenever, on the basis of the transition from the lower part-load range UT into the upper part-load range OT, the maximum pulse width $PW_2$ is retained, this being the pulse width when there is maximum power feeding of the load in the lower part-load range UT, and then the individual pulses PE, with the pulse width $PW_1$ of the first pulse signal train $P_1$ are additionally added, these then replacing one or more individual pulses $PE_2$ of the second pulse signal train $P_2$, the entire power control in the normal upper part-load range preferably taking place exclusively by means of the pulse width $PW_1$ with a constant pulse width $PW_2'$, until the highest upper part-load range HOT is reached.

Figure 6A:
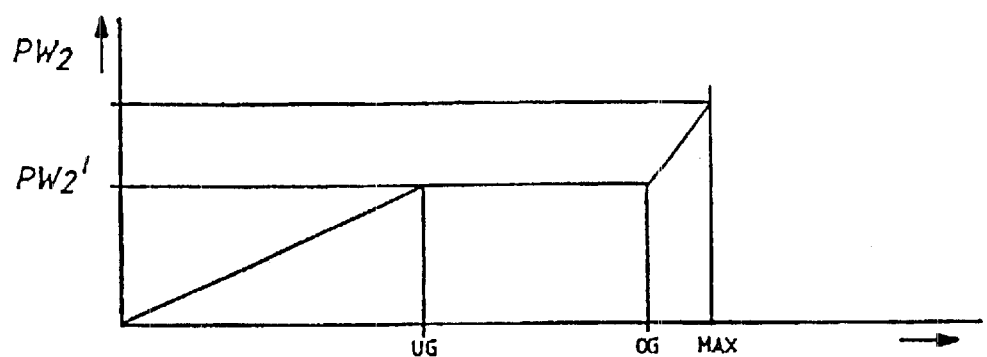
FIGS. 6a and 6b shows a schematic representation of a variant of the first exemplary embodiment in which only one of the pulse signals is pulse-width-modulated at any time, while the other is not pulse-width-modulated.
Figure 6B:
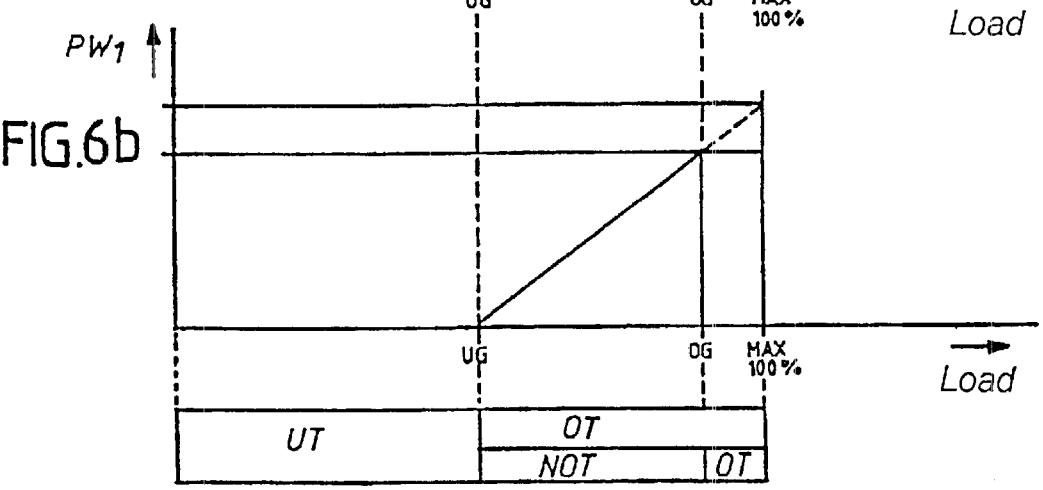

A procedure of this type is represented in FIGS. 6a and b. According to FIG. 6a, the pulse width $PW_2$ in the lower part-load range UT is increased, beginning from a value substantially close to 0%, up to the value $PW_2'$, at which a transition takes place from the lower part-load range into the upper part-load range, the power control taking place in the normal upper part-load range, as represented in FIG. 6, exclusively by variation of the pulse width $PW_1$ until the highest upper part-load range HOT is reached, the pulse width $PW_1$ then in turn being kept constant in this range at the maximum value of the normal upper part-load range, whereas the power control takes place exclusively by means of the pulse width $PW_2$, which for this purpose is increased beyond the value $PW_2'$, which represents the maximum value at the transition from the lower part-load range into the upper part-load range.

Figure 7:
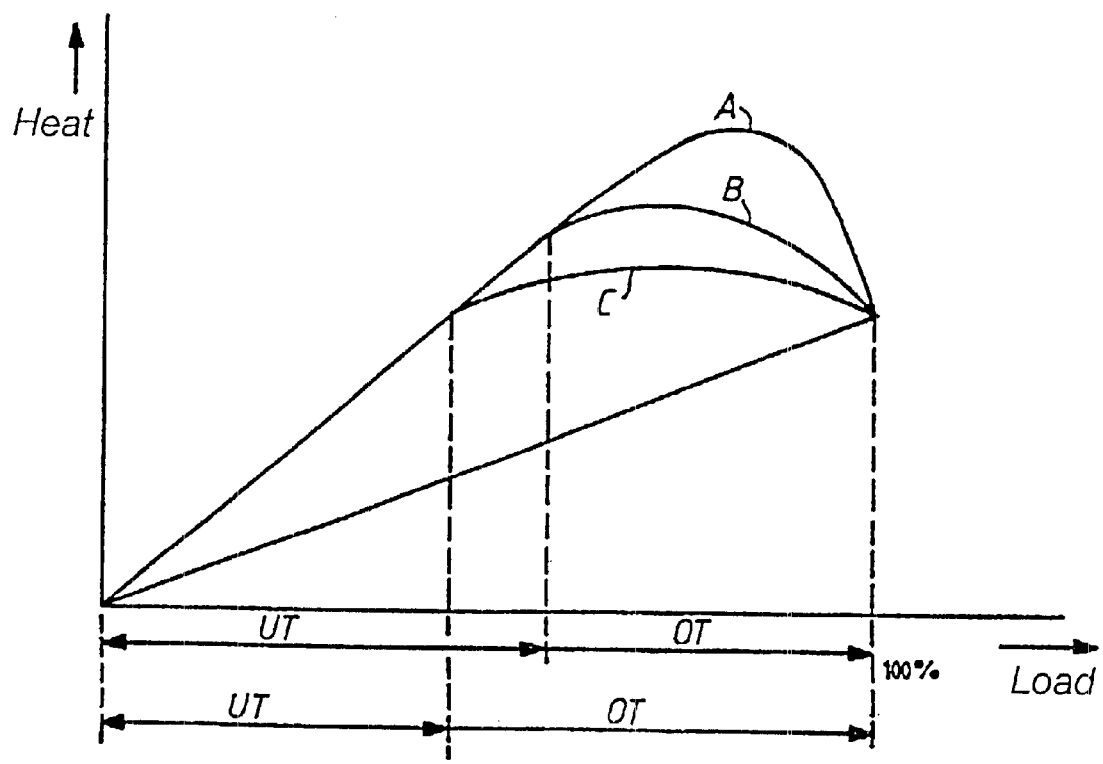
FIG. 7 shows a schematic representation of the reduction in generated heat possible according to the invention.

As represented in FIG. 7, the solution according to the invention allows the thermal losses occurring overall in the case of the control circuit according to the invention to be reduced. FIG. 7 shows in the form of the curve A the progression of the heat losses when the entire power control over the entire range takes place by means of the second pulse signal train $P_2$ and the variation of the pulse width $PW_2$.

If, on the other hand, as represented by the curve B, the power is controlled in the upper part-load range OT by a combination of the individual pulses $PE_1$ of the first pulse signal train $P_1$ and the individual pulses $PE_2$ of the second pulse signal train $P_2$, the heat losses can be significantly reduced. The heat losses can be reduced even more significantly if the transition from the lower part-load range UT into the upper part-load range OT is set at lowest possible values of the part load, as the curve C shows.

Figure 8:
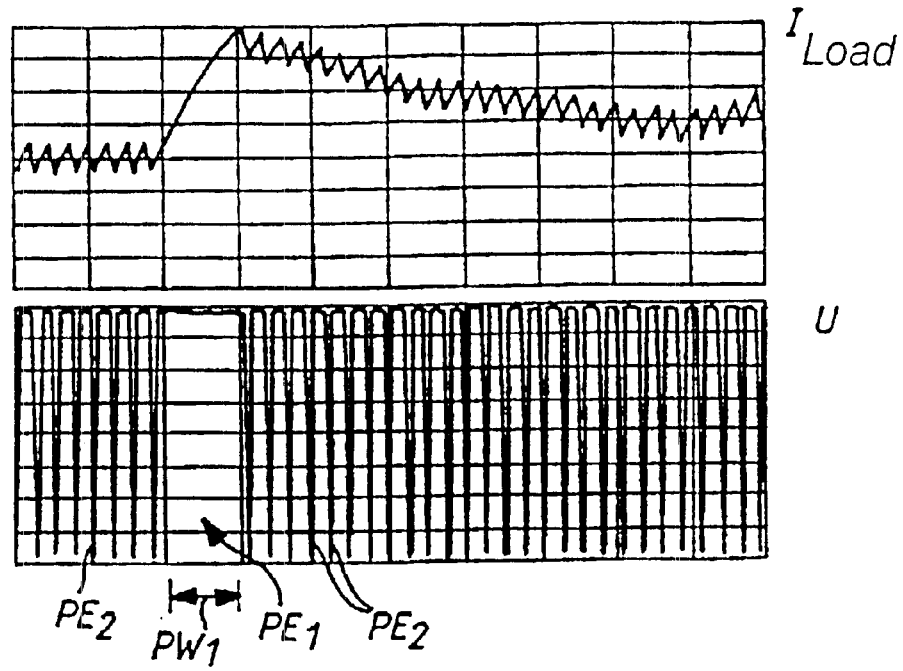
FIG. 8 shows a representation of an actual control signal with the corresponding current flowing via an inductive load, with a small pulse width of the first pulse signal.

The actually occurring current $I_{load}$ at the load 14 is represented in FIG. 8 for a case similar to FIG. 4c, i.e. for the case in which the pulse width $PW_1$ is so low that it extends over few individual pulses $PE_2$ of the second pulse signal train $P_2$. In this case, the current $I_{load}$ flowing via the load 14 rises during the individual pulse $PE_1$ and then slowly falls, the current $I_{load}$ changing in accordance with the series of individual pulses $PE_2$.

Figure 9:
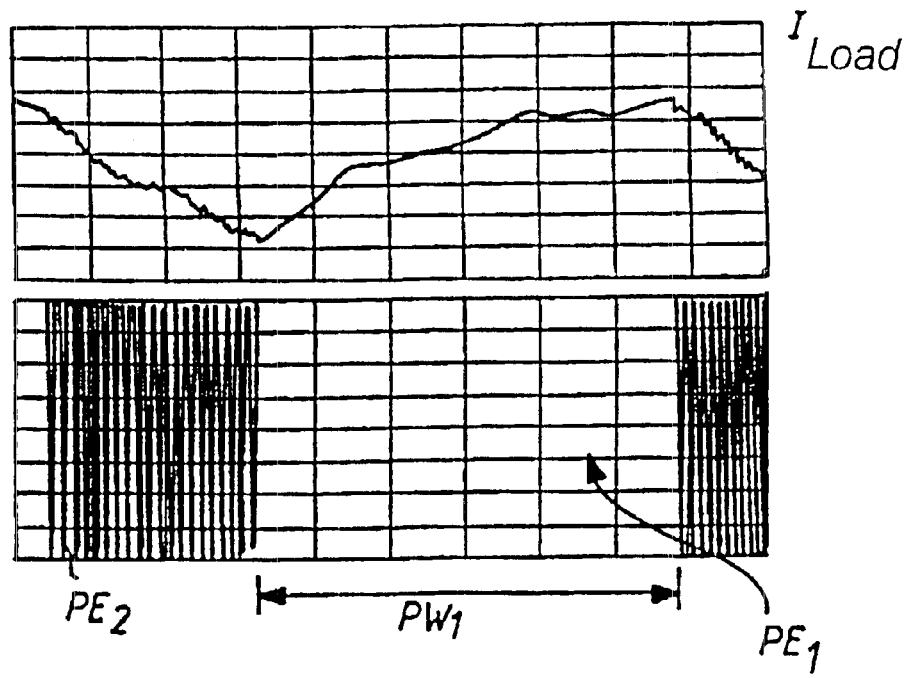
FIG. 9 shows a representation of an actual control signal with a large pulse width and a corresponding current through an inductive load with a freewheeling diode.

If on the other hand, as represented in FIG. 9, the pulse width $PW_1$ of an individual pulse $PE_1$ is chosen to be greater, the progression of the current $I_{load}$ over the load 14 is dominated primarily by the individual pulses $PE_1$ with the pulse width $PW_1$ and only to a slight degree by the individual pulses $PE_2$ in the interpulse periods of the first pulse signal train $P_1$.

What is claimed is:

1. A control circuit for the power-controlled operation of a load in a portion of a load range, said load range extending between no load and full load, comprising:
    a semiconductor switch which is effective in a load circuit to enable pulse width modulation of a voltage supplied to said load for controlling power supplied to said load, and
    a drive circuit for the semiconductor switch, said drive circuit being adapted to generate a control signal for controlling said semiconductor switch,
    for controlling said load in said portion of said load range, said control signal comprises drive pulses following one after the other and separated by interpulse periods, and
    in an upper portion of said portion of said load range, the control signal comprises:
        a first pulse signal, with first individual pulses following one another with a first pulse frequency, and
        a second pulse signal, with second individual pulses following one another with a second pulse frequency in the interpulse periods of the first pulse signal,
        the second pulse frequency being greater than the first pulse frequency by at least a factor of ten,
    wherein in the upper portion of said portion of said load range at least one of the first and the second pulse signals is pulse width modulated for controlling said load.

2. A control circuit according to claim 1, wherein in the upper portion of said portion of said load range both of the first and the second pulse signals are pulse-width-modulated for power control.

3. A control circuit according to claim 1, wherein:
    in the upper portion of said portion of said load range only one of the first or the second pulse signals is pulse-width-modulated; and
    the other of the first or the second pulse signals is kept constant.

4. A control circuit according to claim 2, wherein:
    the upper portion of the portion of said load range is dividable into a highest upper portion and a normal upper portion,
    the individual pulses of the first pulse signal can be pulse-width-modulated in the normal upper portion, and
    the individual pulses of the second pulse signal can be pulse-width-modulated in the highest upper portion.

5. A control circuit according to claim 4, wherein in the normal upper portion, the pulse width of the individual pulses of the second pulse signal is constant.

6. A control circuit according to claim 4, wherein in the highest upper portion, the pulse width of the individual pulses of the first pulse signal is constant.

7. A control circuit according to claim 1, wherein in a lower portion of said portion of said load range lying below the upper portion of said portion of said load range, the control signal comprises a third pulse signal with a third frequency, which is greater than the first frequency.

8. A control circuit according to claim 7, wherein the third frequency is of the same order of magnitude as the second frequency.

9. A control circuit according to claim 8, wherein the third frequency and the second frequency are approximately of the same magnitude.

10. A control circuit according to claim 9, wherein the third frequency is identical to the second frequency.

11. A control circuit according to claim 7, wherein the third pulse signal can likewise be pulse-width-modulated.

12. A control circuit according to claim 7, wherein a transition from the lower portion of said portion of said load range into the upper portion of said portion of said load range takes place at partial load values in the range from approximately 20% to approximately 50%.

13. A control circuit according to claim 12, wherein the transition from the lower portion of said portion of said load range into the upper portion of said portion of said load range takes place at partial load values in the range from approximately 30% to approximately 40%.

14. A control circuit according to claim 1, wherein the second frequency and/or the third frequency is greater than the first frequency by a factor of the order of magnitude of 30 or more.

15. A control circuit according to claim 7, wherein the upper portion of said portion of said load range follows on directly from the lower portion of said portion of said load range.

16. A control circuit according to claim 15, wherein the lower portion of said portion of said load range and the upper portion of said portion of said load range cover an entire portion of said load range up to full load.

17. A control circuit according to claim 1, wherein the drive circuit has a pulse generator and a pulse-shaping stage.

18. A control circuit according to claim 1, wherein:
the first pulse signal and the second pulse signal are generatable as pulse signal trains having individual pulses following continuously one after the other with constant frequency, and
the control signal for the upper portion of said portion of said load range is produced from the pulse signal trains by conducting an OR operation.

19. A method for the power-controlled operation of a load in a portion of a load range, said load range extending between no load and full load, by means of a control circuit having a semiconductor switch which is effective in a load circuit to enable pulse width modulation of a voltage supplied to said load for controlling power supplied to said load, and a drive circuit for the semiconductor switch which is adapted to generate a control signal for controlling said semiconductor switch, said control signal comprising drive pulses following one after the other, separated by interpulse periods, and being adapted to control said load in said portion of said load range, the control signal being generated in an upper portion of said portion of said load range in such a way that it comprises a first pulse signal, with individual pulses following one another with a first pulse frequency, and a second pulse signal, with individual pulses following one another with a second pulse frequency in the interpulse periods of the first pulse signal, and the second pulse frequency being greater than the first pulse frequency by at least a factor of ten, wherein the power-controlled operation is carried out by pulse width modulation of at least one of the first and the second pulse signals.

20. A method according to claim 19, wherein the power-controlled operation is carried out by pulse width modulation of both of the first and the second pulse signals.

21. A method according to claim 19, wherein:
the power controlled operation is carried out by pulse width modulating of only one of the first or the second pulse signals, and
the other of the first or the second pulse signals is kept constant.

22. A method according to claim 19, wherein the upper portion of the portion of said load range is divided into a highest upper portion and a normal upper portion.

23. A method according to claim 22, wherein the first pulse signal is modulated with regard to the pulse width for the power-controlled operation in the normal upper portion.

24. A method according to claim 22, wherein the second pulse signal is modulated for controlling the power in the highest upper portion.

25. A method according to claim 21, wherein the other pulse signal is kept constant with regard to its pulse width.

26. A method according to claim 19, wherein below the upper portion of the portion of said load range, a control signal which comprises a third pulse signal with a third frequency, which is greater than the first frequency, is generated.

27. A method according to claim 26, wherein the third frequency is of the same order of magnitude as the second frequency.

28. A method according to claim 27, wherein the third frequency is substantially identical to the second frequency.

29. A method according to claim 26, wherein the third pulse signal is modulated with regard to its pulse width.

30. A method according to claim 26, wherein the lower portion of the portion of said load range and the upper portion of the portion of said load range cover an entire portion of the load range up to full load.

31. A method according to claim 19, wherein:
the first pulse signal and the second pulse signal are generated as continuous pulse signal trains with constant frequency, and
the control signal in the upper portion of the portion of said load range is generated from the two pulse signal trains by conducting an OR operation.

* * * * *